United States Patent
Schalk et al.

(10) Patent No.: US 11,648,732 B2
(45) Date of Patent: May 16, 2023

(54) INDEXING IN 3D PRINTING

(71) Applicant: HEWLETT-PACKARD DEVELOPMENT COMPANY, L.P., Spring, TX (US)

(72) Inventors: Wesley R. Schalk, Camas, WA (US); Matthew A. Shepherd, Vancouver, WA (US); Arthur H. Barnes, Vancouver, WA (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/591,475

(22) Filed: Feb. 2, 2022

(65) Prior Publication Data
US 2022/0152921 A1 May 19, 2022

Related U.S. Application Data

(63) Continuation of application No. 16/097,226, filed as application No. PCT/US2016/043718 on Jul. 22, 2016, now Pat. No. 11,260,585.

(51) Int. Cl.
*B29C 64/165* (2017.01)
*B33Y 10/00* (2015.01)
(Continued)

(52) U.S. Cl.
CPC .......... *B29C 64/165* (2017.08); *B29C 64/209* (2017.08); *B29C 64/232* (2017.08);
(Continued)

(58) Field of Classification Search
CPC ..... B29C 64/20; B29C 64/165; B29C 64/209; B29C 64/232; B29C 64/236;
(Continued)

(56) References Cited

U.S. PATENT DOCUMENTS

| 5,640,183 A | 6/1997 | Hackleman |
| 6,007,318 A | 12/1999 | Russell et al. |

(Continued)

FOREIGN PATENT DOCUMENTS

| CN | 104339437 A | 2/2015 |
| CN | 105751507 A | 7/2016 |

(Continued)

OTHER PUBLICATIONS

Hauser, C. et al., Rotational 3D Printing of Sensor Devices Using Reactive Ink Chemistries, SFF Symposium Proceedings Manuscript, p. 309-20 (2008).
International Search Report and Written Opinion for International Application No. PCT/US2016/043718, dated Apr. 27, 2017, 7 pages.

*Primary Examiner* — Jerzi H Moreno Hernandez
(74) *Attorney, Agent, or Firm* — Shook, Hardy & Bacon L.L.P.

(57) ABSTRACT

In an example implementation, a method of printing a three-dimensional (3D) object includes scanning a print bar in a first direction over a build platform of a 3D printer to deposit a liquid agent onto a layer of build powder. The print bar is then indexed in a second direction substantially orthogonal to the first direction before scanning the print bar back over the build platform in a third direction opposite the first direction to deposit additional liquid agent onto the layer of build powder.

7 Claims, 7 Drawing Sheets

(51) Int. Cl.
  *B29C 64/232* (2017.01)
  *B29C 64/209* (2017.01)
  *B29C 64/393* (2017.01)
  *B29C 64/236* (2017.01)
  *B33Y 50/02* (2015.01)
  *B33Y 70/00* (2020.01)
  *B29C 64/264* (2017.01)
  *B29C 64/245* (2017.01)

(52) U.S. Cl.
  CPC .......... *B29C 64/236* (2017.08); *B29C 64/393* (2017.08); *B33Y 10/00* (2014.12); *B33Y 70/00* (2014.12); *B29C 64/245* (2017.08); *B29C 64/264* (2017.08); *B33Y 50/02* (2014.12)

(58) Field of Classification Search
  CPC ... B29C 64/245; B29C 64/264; B29C 64/393; B33Y 30/00; B33Y 50/02
  See application file for complete search history.

(56) References Cited

U.S. PATENT DOCUMENTS

| | | |
|---|---|---|
| 6,089,693 A | 7/2000 | Drake et al. |
| 6,460,963 B1 | 10/2002 | Endo |
| 2002/0079601 A1 | 6/2002 | Russell et al. |
| 2007/0070108 A1 | 3/2007 | Mantell et al. |
| 2007/0238056 A1 | 10/2007 | Baumann et al. |
| 2008/0241404 A1 | 10/2008 | Allan et al. |
| 2010/0033521 A1 | 2/2010 | Kritchman |
| 2015/0022604 A1 | 1/2015 | Woolfe et al. |
| 2015/0079214 A1 | 3/2015 | Shi et al. |
| 2015/0197082 A1 | 7/2015 | Rossell et al. |
| 2017/0021564 A1 | 1/2017 | Ooba et al. |

FOREIGN PATENT DOCUMENTS

| | | |
|---|---|---|
| TW | 201509693 A | 3/2015 |
| WO | WO-9717664 | 5/1997 |
| WO | WO-2016048357 | 3/2016 | ns of liquid agent over the same region of the build platform, which can reduce the effect of nozzle oriented defects, including die stitching defects, and increase the overall print quality and strength of a 3D object.

INDEXING IN 3D PRINTING

CROSS REFERENCE TO RELATED APPLICATIONS

This application is a continuation of U.S. application Ser. No. 16/097,226, filed Oct. 26, 2018, which is a 371 application of PCT Application No. PCT/US2016/043718, filed Jul. 22, 2016. The contents of both U.S. application Ser. No. 16/097,226 and PCT Application No. PCT/US2016/043718 are incorporated herein by reference in their entirety.

BACKGROUND

Additive manufacturing processes can produce three-dimensional (3D) objects by providing a layer-by-layer accumulation and unification of material patterned from a digital model. In 3D printing, for example, digitally patterned portions of successive material layers can be joined together by fusing, binding, or solidification through processes including melting, sintering, extrusion, and irradiation. The quality, strength, and functionality of objects produced by such systems can vary depending on the type of additive manufacturing technology used.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Figure 1:
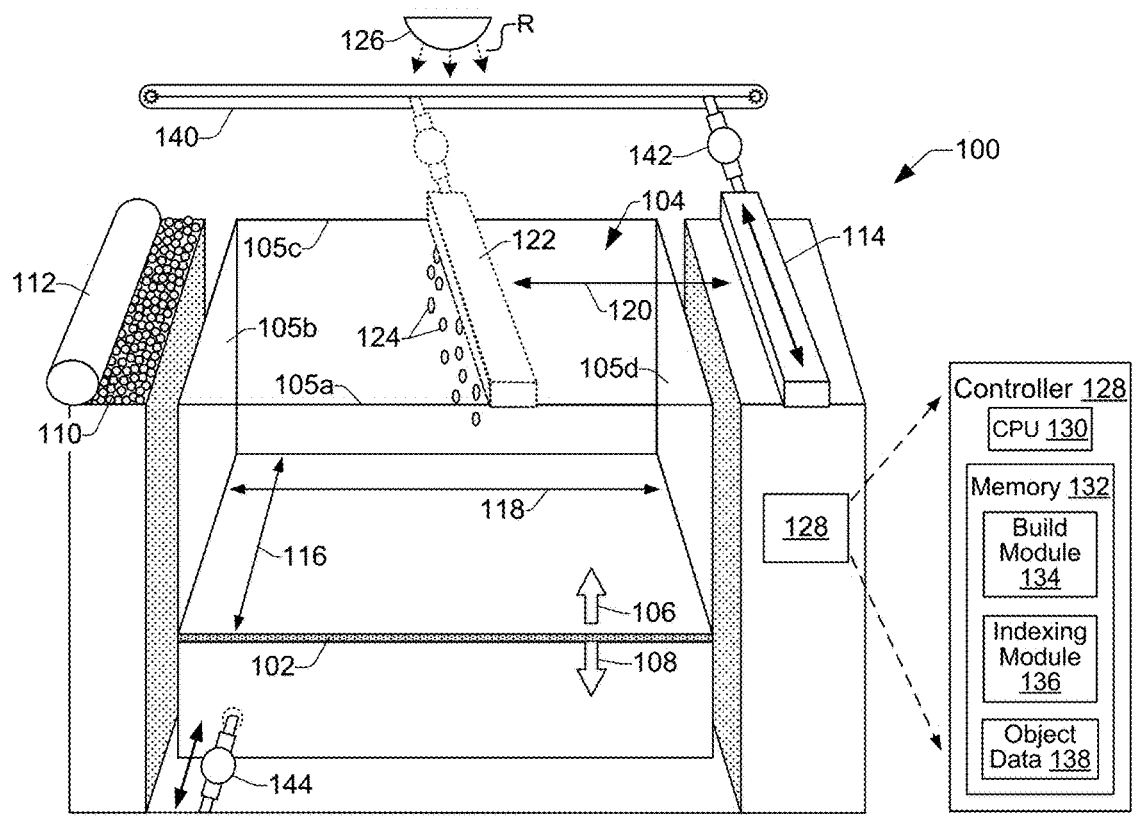
FIG. 1 shows a perspective view of an example 3D printing system suitable for implementing a multiple pass indexing method that enables more than one nozzle to print a liquid agent over a region of a build platform.

In some examples of three-dimensional (3D) printing, 3D objects can be produced in a 3D printing system (i.e., a 3D printer) by depositing and processing layers of build material, such as layers of powdered nylon, or polyamide. Each layer of build material (i.e., powder) can be deposited and processed on a build platform within a system work space. The build platform, sometimes referred to as a powder bed, can be moved vertically downward to increase the height of the work space as additional layers of powder are deposited and processed. Processing can include the selective application of a liquid agent onto layers of the powder in areas where the powder is to be fused together. For example, a liquid fusing agent can be applied to cover a cross-sectional area of a 3D object being printed, according to a 3D digital model. The fusing agent can coat the exterior surface of the powder and penetrate into a layer of powder. Processing can also include exposing the powder to a fusing energy such as visible light radiation, infrared (IR) radiation, and ultraviolet radiation. The fusing agent deposited onto the build powder can absorb the radiation and convert it into thermal energy. The thermal energy can fuse (i.e., melt and coalesce) those areas of the powder to which the fusing agent has been applied. This process can be repeated with each layer of powder deposited into the work space until each cross-sectional area is fused together to form a 3D object.

In some examples, 3D printing systems can implement inkjet technology to deposit the liquid fusing agent onto the layers of build powder. For example, a liquid agent dispenser can include a drop-on-demand printhead that can be scanned over the build platform to selectively deliver a fusing agent or other liquid onto a powder bed. Printheads can include, for example, thermal inkjet or piezoelectric inkjet printheads that have arrays of liquid ejection nozzles to jet the liquid agents onto the powder. In some examples, multiple printheads can be aligned end-to-end along the length of a print bar to enable a page-wide, or platform-wide, coverage of the powder bed through a single scan of the print bar over the build platform.

3D printers that include powder beds and liquid jetting systems with scanning printheads are susceptible to various nozzle oriented defects that can result in reduced quality in printed objects, such as reduced surface color quality and reduced part strength. For example, printhead nozzles can become blocked from airborne powder, other ambient debris, and/or dried agents. Other defects can include nozzles with drop ejection directionality differences, nozzles with drop-weight and drop-shape differences, and nozzles with differences in colorant concentration. In some examples, color concentration differences between nozzles can result from temperature variation across a single printhead die during printing, and/or die-to-die variations when multiple die are printing from a print bar, for example. In other examples, print bars with multiple aligned dies can exhibit die stitching defects that can cause irregular print patterns.

The use of redundant nozzles in a printhead can help to remedy some nozzle oriented defects. However, because printheads can have many thousands of nozzles, adding nozzle redundancy can increase the cost of a printing system considerably. In addition, the use of redundant nozzles can include examining the performance of each nozzle on a printhead to detect which nozzles are defective, and then employing redundant nozzles to remedy the defective nozzles. In addition to the added costs associated with detecting defective nozzles, the additional time expended between printhead scanning cycles to examine thousands of nozzles can have a noticeable adverse impact on printing speed.

Accordingly, in some examples described herein, a multiple pass indexing 3D printer enables printing a 3D object by scanning a printhead, or print bar, over a build platform multiple times and in different indexed positions in order to deposit a liquid agent onto a layer of build powder. As used herein, 'printhead' can refer to an elongated print bar having multiple printhead die aligned generally end-to-end to provide a fixed array of printhead nozzles that can cover an entire width of a print zone, such as the width of a powder bed. Indexing the printhead between multiple passes in an orthogonal direction relative to the scanning/printing direction of the printhead enables more than one nozzle to print over a region of the build platform. Regions that may have been missed or misprinted on a first pass by defective nozzles can be covered by different nozzles on a subsequent pass. In some examples, single pass indexing can be implemented where the printhead is indexed between powder layers after a single pass per each layer. Single pass indexing can decrease the time to print each layer as indexing the printhead orthogonally and translating the printhead back to a start position can both occur while a next layer of powder is being deposited onto the build platform.

Multiple printhead passes at different indexed positions can remedy defects such as missing nozzles, nozzles with drop ejection directionality differences, nozzles with drop-weight and drop-shape differences, nozzles with color concentration differences, and die stitching defects. Each pass of the printhead can print a similar or different loading of agents. The process can be repeated multiple times per each layer of build powder while the printhead is in a different orthogonal offset for each pass. In some examples, instead of indexing the printhead, the build platform can be indexed. Indexing the printhead and/or build platform in this manner can reduce costs associated with using physical redundant nozzles and improve build speed and throughput by reducing down time that may otherwise be expended for detecting nozzle defects and servicing the printhead. This solution may additionally reduce costs associated with color calibrations and scanner alignments.

In a particular example, a method of printing a 3D object includes scanning, or moving, a print bar in a first direction over a build platform of a 3D printer to deposit a liquid agent onto a layer of build powder. After scanning in the first direction, the print bar is indexed in a second direction that is substantially orthogonal to the first direction. The print bar is then scanned back over the build platform in a third direction that is opposite of the first direction to deposit additional liquid agent onto the layer of build powder.

In another example, a non-transitory machine-readable storage medium stores instructions that when executed by a processor of a three-dimensional (3D) printer cause the 3D printer to apply a layer of build powder onto a build platform of a 3D printer. The printer can deposit a liquid agent onto the powder with multiple passes of a print bar over the platform. During a first pass, the print bar can be passed over the platform with the print bar and platform in a first relative position to one another. After the first pass, the print bar and platform can be indexed relative to one another to put the print bar and platform into a second relative position to one another. During a second pass, the print bar can pass over the platform with the print bar and platform in the second relative position.

In another example, a device for printing 3D objects includes a build platform to receive build powder. The device also includes a print bar to scan back and forth over the platform in multiple passes while selectively depositing a liquid agent onto the build powder. A motorized indexing arm is coupled to the print bar to index the print bar after each pass of the print bar over the platform. The indexing arm indexes the print bar in a direction orthogonal to the scanning direction of the print bar during each pass.

FIG. 1 shows a perspective view of an example three-dimensional (3D) printing system 100 suitable for implementing a multiple pass indexing method that enables more than one nozzle to print a liquid agent over a region of a build platform. The example printing system 100 includes a moveable printing platform 102, or build platform 102 that can serve as a floor to a work space 104 in which a 3D object (not shown in FIG. 1) can be printed. The work space 104 can include fixed walls 105 (illustrated as front wall 105a, side wall 105b, back wall 105c, side wall 105d) around the build platform 102. The fixed walls 105 and platform 102 can contain a volume of powdered build material deposited layer by layer into the work space 104 during printing of a 3D object. For purposes of this description and to help illustrate different elements and functions of the 3D printing system 100, the front wall 105a of the work space 104 is shown as being transparent. During printing, a build volume within the work space 104 can include all or part of a 3D object formed by layers of powder that are processed with the application of liquid fusing agent and fusing energy (e.g., radiation). The build volume can also include non-processed powder that surrounds and supports the 3D object within the work space 104.

The build platform 102 is moveable within the work space 104 in an upward and downward direction as indicated by up arrow 106 and down arrow 108, respectively. When printing of a 3D object begins, the build platform 102 can be located in an upward position toward the top of the work space 104 as a first layer of powdered build material is deposited onto the platform 102 and processed. After a first layer of powder has been processed, the platform 102 can move in a downward direction 108 as additional layers of powdered build material are deposited onto the platform 102 and processed.

The example 3D printing system 100 includes a supply of powdered build material 110, or powder. The build material, alternately referred to herein as "powder", can comprise powdered material made from various materials that are suitable for producing 3D objects. Such powdered materials can include, for example, polymers, glass, ceramics (e.g., alumina, $Al_2O_3$), Hydroxyapatite, metals, and so on. The printing system 100 can feed powder from the supply 110 into the work space 104 using a spreader 112 to controllably form the powder into layers over the build platform 102, and/or over other previously deposited layers of powder. A spreader 112 can include, for example, a roller, a blade, or another type of material spreading device. Although not illustrated, in some examples a carriage can be associated with the powder supply 110 and/or powder spreader 112 to convey the supply and spreader over the build platform 102 during the forming of a layer of powder onto the platform.

The example 3D printing system 100 also includes a liquid agent dispenser 114. While other types of liquid dispensers are possible, the example dispenser 114 shown and described herein comprises a drop-on-demand printhead 114 that can be scanned, or moved, over the build platform 102 to selectively deliver a fusing agent or other liquid onto a powder bed. Examples of drop-on-demand printheads include thermal inkjet and piezoelectric inkjet printheads that comprise an array of liquid ejection nozzles. In some examples, the printhead 114 has a length dimension that enables it to span the full depth 116 of the build platform 102. Thus, a printhead 114, alternately referred to herein as a print bar 114, can enable a page-wide or platform-wide coverage of the powder bed through a single scan of the print bar over the build platform 102. In some examples, a 3D printing system 100 can include more than one print bar 114.

FIG. 1 shows an example of the scanning motion (illustrated by direction arrow 120) of the print bar 114. In some examples a carriage (not shown) can be associated with the print bar 114 to convey the print bar 114 over the build platform 102 during the application of a liquid agent onto a layer of powder on the platform 102. In some examples the print bar 114 can be coupled to a conveyor 140 that can be controlled to scan the print bar 114 over the platform 102, as illustrated by the dashed-line print bar representation 122.

As discussed in more detail below, the print bar 114 can be scanned back and forth over the platform 102 in different indexed positions. Although not shown in the example of FIG. 1, during printing a portion of a 3D object would be present within the work space 104 as the print bar 114 scans over the work space and ejects droplets 124 of a fusing agent or other liquid.

Figure 2:
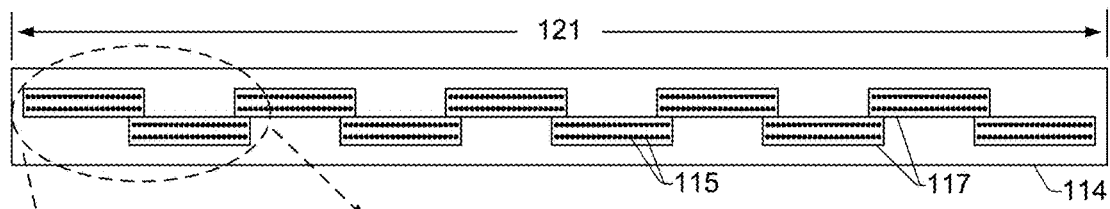
FIG. 2 shows a bottom view of an example of a print bar suitable to provide platform-wide printing of a liquid agent onto a layer of powder on a build platform.
Figure 2:
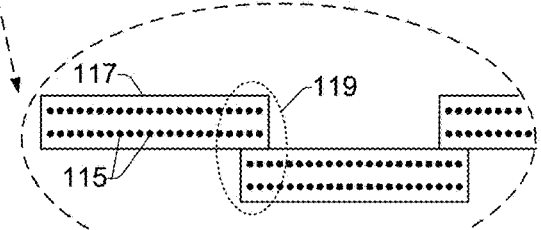

FIG. 2 shows a bottom view of an example of a print bar 114 suitable to provide platform-wide printing of a liquid agent onto a layer of powder on the build platform 102. Platform-wide printing is enabled in part, by the print bar 114 having multiple printhead die 117 positioned in parallel along the length 121 of the print bar 114 in an end-to-end alignment 119. As shown in the blow up view of FIG. 2, the ends of the multiple printhead die 117 can be arranged in an overlapping alignment of nozzles to help provide a seamless printing transition between the multiple die. With a continuous array of nozzles 115 spanning its length 121, the print bar 114 can scan over the full width 118 and depth 116 of the build platform 102 as the nozzles jet droplets 124 of a fusing agent, colorant, or other liquid onto layers of powder within the work space 104. The bottom view of the print bar 114 shown in FIG. 2 is provided for the purpose of illustrating an example arrangement of printhead die 117 and nozzles 115 on the bottom side of the print bar, while the print bar 114 (122) in FIG. 1 is shown from a top perspective view with the nozzles 115 facing downward to eject liquid agent droplets 124 over the build platform 102.

Figure 3:
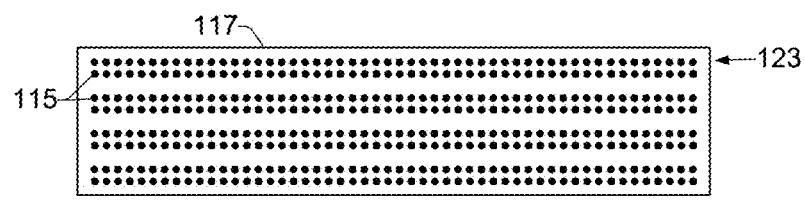
FIG. 3 shows an example printhead die that includes eight rows of nozzles.

While the example printhead die shown in FIG. 2 include two rows of nozzles 115, other nozzle configurations on a printhead die are possible and contemplated. FIG. 3 shows an example printhead die 117 that includes eight rows 123 of nozzles. Such an arrangement can enable multiple liquid agents, such as different ink colors and/or different fusing agents, to be applied to a powder layer in a single pass over the build platform 102. In some examples, each of the two pairs of adjacent rows of nozzles 115 can be associated with a different fluid slot (not shown) formed in the substrate of the die 117. Each fluid slot can supply a different liquid agent to nozzles in an associated pair of adjacent rows of nozzles.

Examples of liquid agents suitable for ejection from nozzles in a print bar 114 can include water-based dispersions comprising a radiation absorbing agent. The radiation absorbing agent can comprise, for example, an infrared (IR) radiation absorber, a near infrared radiation absorber, an ultraviolet radiation absorber, or a visible light absorber. In some examples, a fusing agent can be an ink-type formulation as the radiation absorbing agent. In some examples, a fusing agent can be an ink or other liquid that absorbs energy in the IR spectrum but reflects energy in the visible light spectrum. Dye based and pigment based colored inks are examples of inks that include visible light absorbing agent.

As shown in FIG. 1, the example 3D printing system 100 also includes a fusing energy source such as radiation source 126. The radiation source 126 can be implemented in a variety of ways including, for example, as a curing lamp or as light emitting diodes (LEDs) to emit IR, near-IR, UV, or visible light, or as lasers with specific wavelengths. The radiation source 126 can depend in part on the type of fusing agent and/or powder being used in the printing process. In different examples, the radiation source 126 can be attached to a carriage (not shown) to be scanned across the work space 104. The radiation source 126 can apply radiation R to layers of powder in the work space 104 to facilitate the heating and fusing of the powder. In some examples, a fusing agent 124 can be selectively applied by print bar 114 to a layer of powder to enhance the absorption of the radiation R and help convert the absorbed radiation into thermal energy. In areas where fusing agent has been applied to the powder, the absorbed radiation can heat the powder sufficiently to cause fusing of the powder.

Referring still to FIG. 1, the example 3D printing system 100 additionally includes an example controller 128. The controller 128 can control various operations of the printing system 100 to facilitate the printing of 3D objects as generally described above, such as spreading powder into the work space 104, selectively applying fusing agent 124 to portions of the powder, and exposing the powder to radiation R. In addition, as described in more detail below, the controller 128 can control the 3D printing system 100 to perform multiple passes of the print bar 114 over the build platform 102 in different indexed positions to deposit a liquid agent onto the powder. Indexing the print bar 114 and/or build platform 102 to different positions between each print bar pass enables more than one nozzle to print over a region of the build platform 102 and helps to provide coverage of regions that may have been missed or misprinted by a defective nozzle.

As shown in FIG. 1, an example controller 128 can include a processor (CPU) 130 and a memory 132. The controller 128 may additionally include other electronics (not shown) for communicating with and controlling various components of the 3D printing system 100. Such other electronics can include, for example, discrete electronic components and/or an ASIC (application specific integrated circuit). Memory 132 can include both volatile (i.e., RAM) and nonvolatile memory components (e.g., ROM, hard disk, optical disc, CD-ROM, magnetic tape, flash memory, etc.). The components of memory 132 comprise non-transitory, machine-readable (e.g., computer/processor-readable) media that can provide for the storage of machine-readable coded program instructions, data structures, program instruction modules, JDF (job definition format), 3MF formatted data, and other data and/or instructions executable by a processor 130 of the 3D printing system 100.

An example of executable instructions to be stored in memory 132 include instructions associated with a build module 134 and an indexing module 136, while examples of stored data can include object data 138. In general, modules 134 and 136 include programming instructions executable by processor 130 to cause the 3D printing system 100 to perform operations related to printing 3D objects within a work space 104, including performing indexing a print bar 114 and/or build platform 102 between multiple print bar 114 passes over the platform 102. Such operations can include, for example, the operations of methods 700 and 800, described below with respect to FIGS. 7 and 8, respectively.

In some examples, controller 128 can receive object data 138 from a host system such as a computer. Object data 138 can represent, for example, object files defining 3D object models to be produced on the 3D printing system 100. Executing instructions from the build module 134, the processor 130 can generate print data for each cross-sectional slice of a 3D object model from the object data 138. The print data can define, for example, each cross-sectional slice of a 3D object model, the liquid agents to be used to cover the build powder within each cross-sectional slice, and how fusing energy is to be applied to fuse each layer of powder. The processor 130 can use the print data to control components of the printing system 100 to process each layer of powder. Thus, the object data can be used to generate commands and/or command parameters for controlling the distribution of build powder from a supply 110 onto the build platform 102 by a spreader 112, the application of fusing agents by a print bar 114 onto layers of the powder, the application of radiation by a radiation source 126 to the layers of powder, and so on.

The indexing module 136 includes further executable instructions to enable a processor 130 to control the 3D printing system 100 to perform multiple passes of the print bar 114 over the build platform 102 in different indexed positions to deposit a liquid agent onto a single or same layer of powder. More specifically, indexing module instructions can execute to control a conveyor 140 to scan the print bar 114 back and forth across the platform 102 to apply a liquid agent onto a powder layer in multiple passes. The instructions can further control a motorized print bar indexing arm 142 to index the print bar in directions that are substantially orthogonal to the scanning direction of the print bar 114. The instructions can also control print data to adjust the distribution of liquid agent among individual nozzles and/or rows of nozzles. For example, because indexing the print bar 114 and/or build platform 102 to different positions between print bar passes enables more than one nozzle to print over a region of the build platform 102, the print data that controls the color, type, and/or loading of liquid agent to be deposited over that region can be shifted accordingly to different nozzles and/or rows of nozzles to correspond with the direction of indexing. For example, indexing the print bar 114 in a +Y direction (e.g., see description of FIG. 4a) may result in print data being shifted to nozzles or rows of nozzles that are in the −Y direction on the print bar 114. Indexing of the print bar 114 can occur at different times, such as before or after a first pass, before or after a second pass, and so on. In some examples, instead of indexing the print bar 114, the indexing module instructions can control indexing of the build platform 102. Thus, the indexing module instructions can control a motorized platform indexing arm 144 to index the build platform 102 in directions that are substantially orthogonal to the scanning direction of the print bar 114.

Figure 4A:
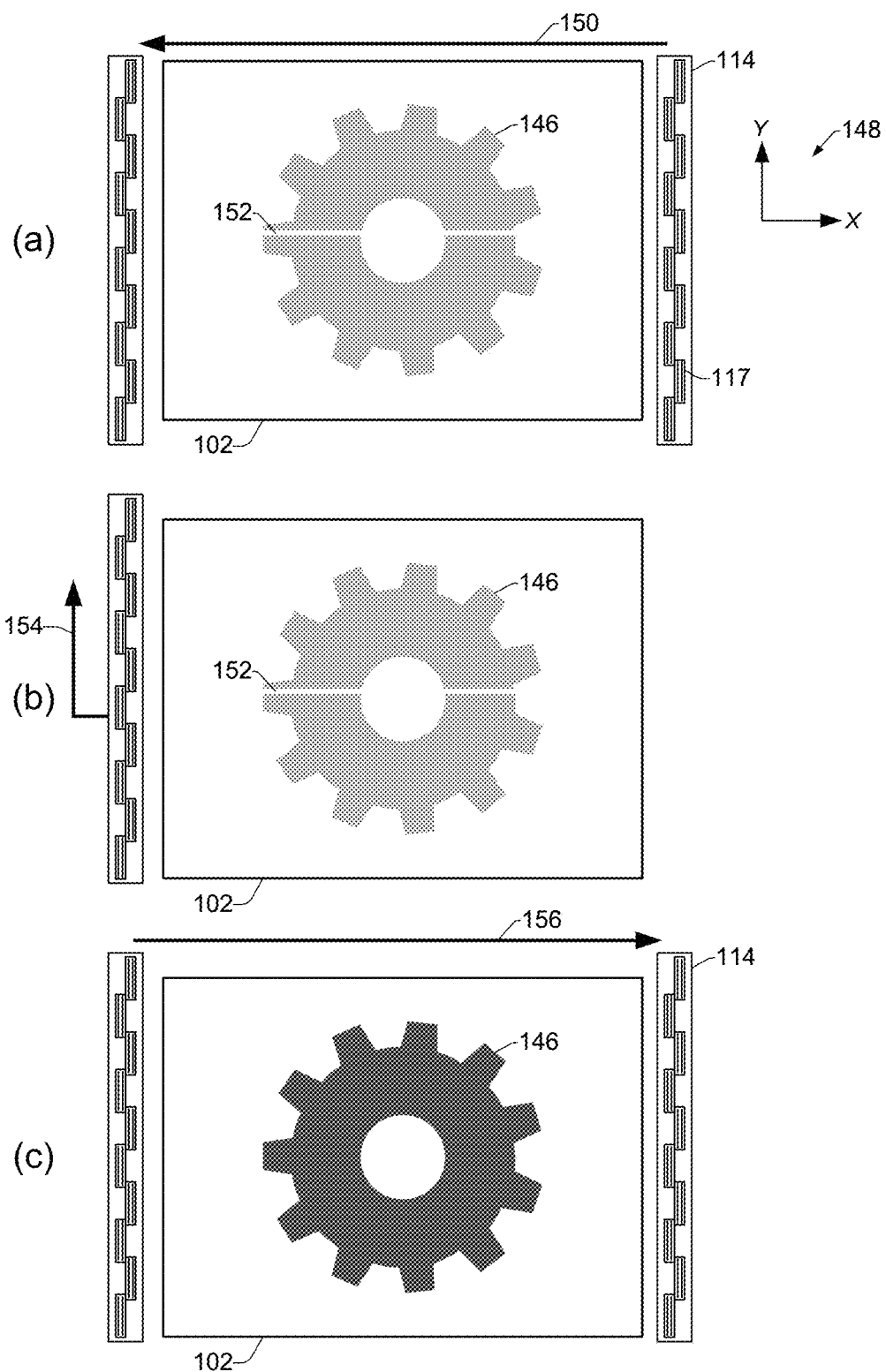
FIG. 4a shows an example of multiple pass 3D printing with print bar indexing.

FIG. 4a shows an example of multiple pass 3D printing with print bar indexing. FIG. 4a shows several top down views of an example build platform 102 during multiple passes of a print bar 114 over the platform 102 to deposit a liquid agent onto a powder layer of a 3D object 146. The print bar 114 in FIG. 4a is shown as transparent in order to illustrate the arrangement of printhead die 117 aligned on the bottom side of the print bar 114. In view (a) of FIG. 4a, the print bar 114 begins on the right side of the platform 102 in a first Y-coordinate indexed position with respect to the illustrated XY coordinate plane 148. In a first pass, the print bar 114 is scanned over the build platform 102 in a first direction 150 from the right side to the left side of the platform 102 (i.e., in a −X direction) to print a liquid agent onto a layer of a 3D object 146. As shown in view (a) of FIG. 4a, in some examples a print defect 152 can occur due to one or multiple defective nozzles on the print bar 114. The print defect 152 is illustrated as a white line to indicate a region of the build platform 102 or powder layer that was not printed on with liquid agent.

As shown in view (b) of FIG. 4a, when the print bar 114 completes its first pass over the build platform 102, the printing system 100 indexes the print bar 114 in the +Y direction in preparation for a second pass over the platform 102. In some examples, the system can index the print bar 114 in −Y direction. In any case, the indexing direction 154 of the print bar 114 comprises a second direction 154 of movement that is substantially orthogonal to the scanning or printing direction of the print bar 114. Indexing the print bar 114 in the second direction 154 moves the print bar 114 to a second Y-coordinate indexed position (i.e., in XY coordinate plane 148) in preparation for a second pass over the platform 102.

In some examples, the indexing offset amount, or distance, of print bar movement in the Y direction can be on the order of one half the length of a printhead die 117, to one full length of a printhead die 117. Other indexing distances are also possible. In general, the index offset distance can be a minimum distance that moves nozzles far enough on the 3D object 146 that print defects from defective nozzles on a first pass can be remedied on a subsequent pass, and so defects from the subsequent pass will be less apparent. As described below with respect to FIG. 6, different indexing schemes that define varying indexing directions and distances, as well as varying multiple print bar pass patterns, can be implemented and controlled through executable instructions from indexing module 136.

As shown in view (c) of FIG. 4a, after the print bar 114 is indexed in the (+) Y direction to a second indexed position, the print bar 114 is then scanned in a third direction 156 over the build platform 102 to deposit a liquid agent onto the same layer of the 3D object in a second pass. The third direction 156 is opposite the first direction 150. As shown by the object 146 in view (c), the print defect 152 from defective nozzles on the first pass has been resolved by working nozzles that have applied liquid agent to the region of the build platform 102 that was not printed on in the first pass. In some examples, the print bar 114 can then be indexed in the −Y direction back to the first Y-coordinate position (i.e., the starting position) in preparation to print onto another layer of powder added to the 3D object 146. Alternatively, the process can be repeated multiple times on the same layer of the 3D object 146, with the print bar 114 being indexed to a different orthogonal offset per pass.

Figure 4B:
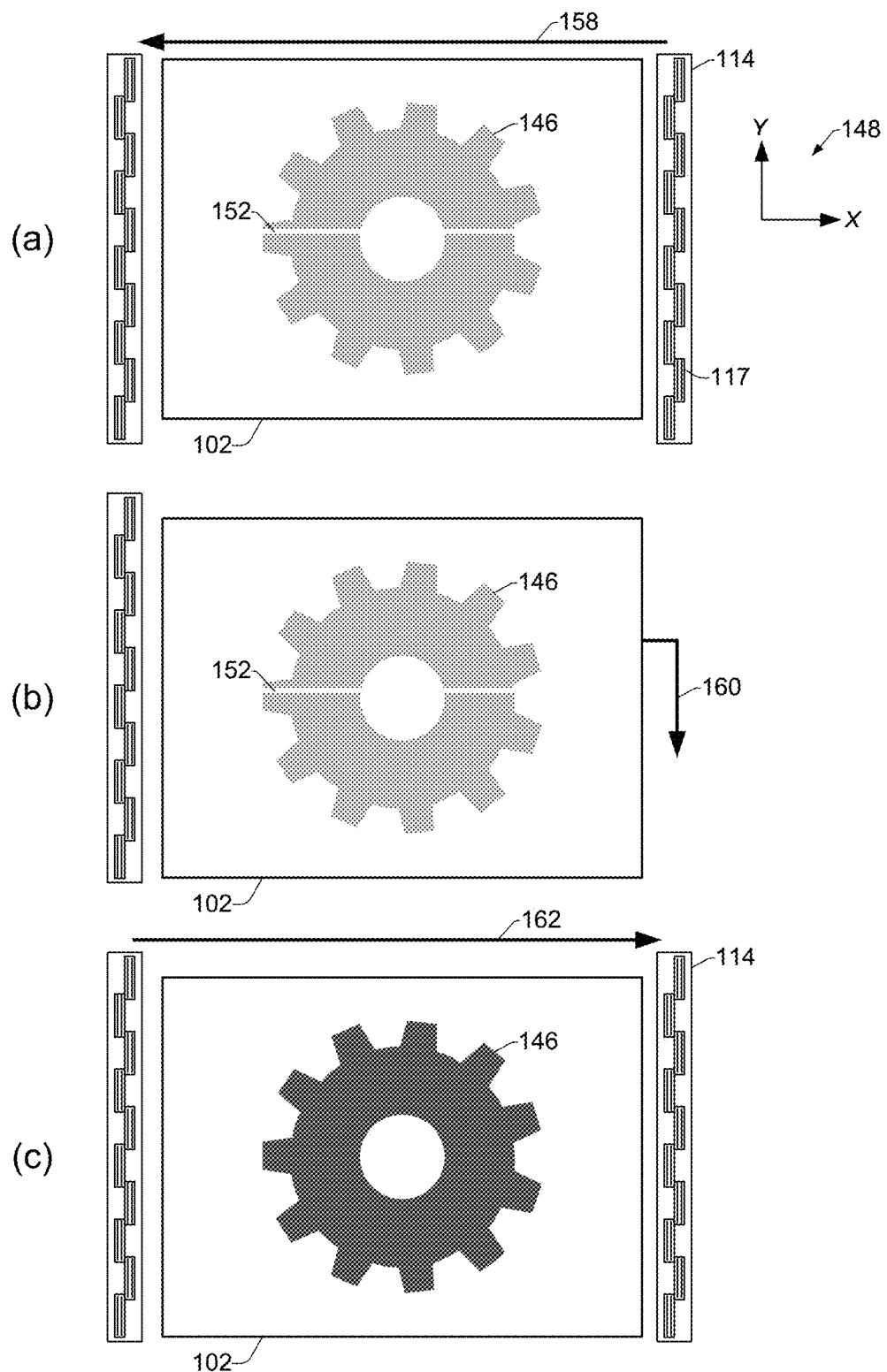
FIG. 4b shows an example of multiple pass 3D printing with build platform indexing.

In some examples, rather than indexing the print bar 114, the printing system 100 may instead index the build platform 102 in the positive (+) or negative (−) Y directions. FIG. 4b shows an example of multiple pass 3D printing with build platform indexing. FIG. 4b shows several top down views of an example build platform 102 during multiple passes of a print bar 114 over the platform 102 to deposit a liquid agent onto a powder layer of a 3D object 146. The print bar 114 in FIG. 4b is shown as transparent in order to illustrate the arrangement of printhead die 117 aligned on the bottom side of the print bar 114. In view (a) of FIG. 4b, the print bar 114 begins on the right side of the platform 102 with the build platform 102 in a first Y-coordinate indexed position with respect to the illustrated XY coordinate plane 148.

In a first pass, the print bar 114 is scanned over the build platform 102 in a first direction 158 from the right side to the left side of the platform 102 (i.e., in a −X direction) to print a liquid agent onto a layer of a 3D object 146. As shown in view (a) of FIG. 4b, in some examples a print defect 152 can occur due to one or multiple defective nozzles on the print bar 114. The print defect 152 is illustrated as a white line to indicate a region of the build platform 102 or powder layer that was not printed on with liquid agent.

As shown in view (b) of FIG. 4b, when the print bar 114 completes its first pass over the build platform 102, the printing system 100 indexes the build platform 102 in the negative −Y direction in preparation for a second pass of the print bar 114 over the platform 102. In some examples, the system can index the platform 102 in a positive +Y direction. The platform indexing direction 160 is substantially orthogonal to the scanning or printing direction of the print bar 114. Indexing the build platform 102 moves the platform 102 to a second Y-coordinate indexed position in preparation for a second pass of the print bar 114 over the platform 102.

The index offset used when indexing the build platform 102 can be similar to the index offset used when indexing the print bar 114. As noted above, in some examples the index offset can be on the order of one half the length of a printhead die 117, to one full length of a printhead die 117, with other offset values being possible. Indexing the build platform 102 shifts the 3D object 146 with respect to nozzles on the print bar 114 so that different nozzles will be positioned to cover regions where there may be print defects caused by defective nozzles on the first pass.

As shown in view (c) of FIG. 4b, after the build platform 102 is indexed in the −Y direction to a second indexed position, the print bar 114 is then scanned back over the platform 102 in a direction 162 opposite the first scan direction 158 to deposit a liquid agent onto the same layer of the 3D object in a second pass. As shown by the object 146 in view (c), the print defect 152 from defective nozzles on the first pass has been resolved by working nozzles that have applied liquid agent to the region of the build platform 102 that was not printed on in the first pass. In some examples, the build platform 102 can then be indexed in the +Y direction back to the first Y-coordinate position (i.e., the starting position) in preparation to print onto another layer of powder added to the 3D object 146. Alternatively, the process can be repeated multiple times on the same layer of the 3D object 146, with the platform 102 being indexed to a different orthogonal offset per pass.

Figure 5:
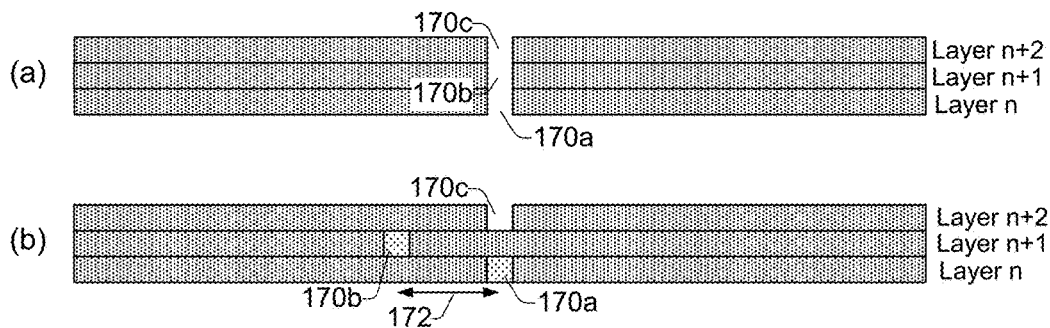
FIG. 5 shows an example of several layers of a 3D object to demonstrate the effect of single pass indexing.

As mentioned above, in some examples single pass indexing can be implemented where the printhead is indexed between powder layers after a single pass per each layer. FIG. 5 shows an example of several layers of a 3D object to demonstrate the effect of single pass indexing. In part (a) of FIG. 5, each layer n, n+1, and n+2, has been printed with a single pass of the print bar 114, but without indexing in between layers. Each of three layers n, n+1, and n+2, in FIG. 5, shows a missing region 170 (illustrated as regions 170a, 170b, 170c) where a defective nozzle or nozzles missed printing onto the layer. It is apparent in part (a) of FIG. 5, how the missing regions 170 are lined up due to no indexing. In part (b) of FIG. 5, the print bar 114 has been indexed by a distance 172 in between each layer. The missing regions 170 in part (b) of FIG. 5 are separated horizontally by the indexing distance 172. While the missing region 170c in layer n+2 appears to be empty, the missing region 170b is darkened, which indicates it has been partially or fully fused by the fusing of above layer n+2 and by heat conducting from layer n. Furthermore, the missing region 170a in layer n has been partially or fully fused by the fusing of layer n+1 directly above. Objects printed with single pass printing will have greater strength if indexing between the layers is implemented. This is because regions that do not get printed on due to a nozzle defect can be partially or fully fused due to energy applied to the next layer or heat conducting from the previous layer.

Figure 6A:
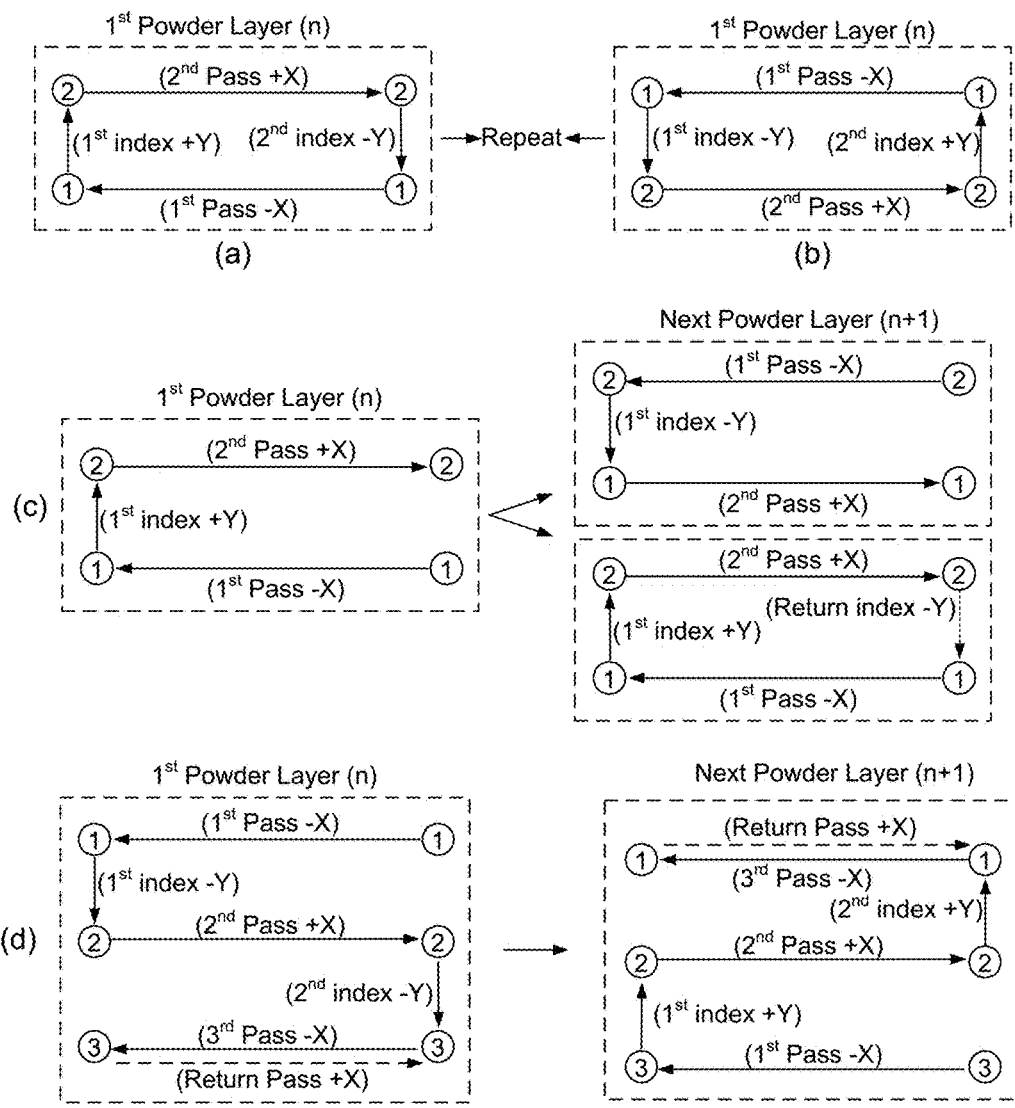
FIGS. 6a and 6b show examples of different multiple pass indexing schemes that may be suitable for multiple pass 3D printing and indexing in a 3D printing system.
Figure 6B:
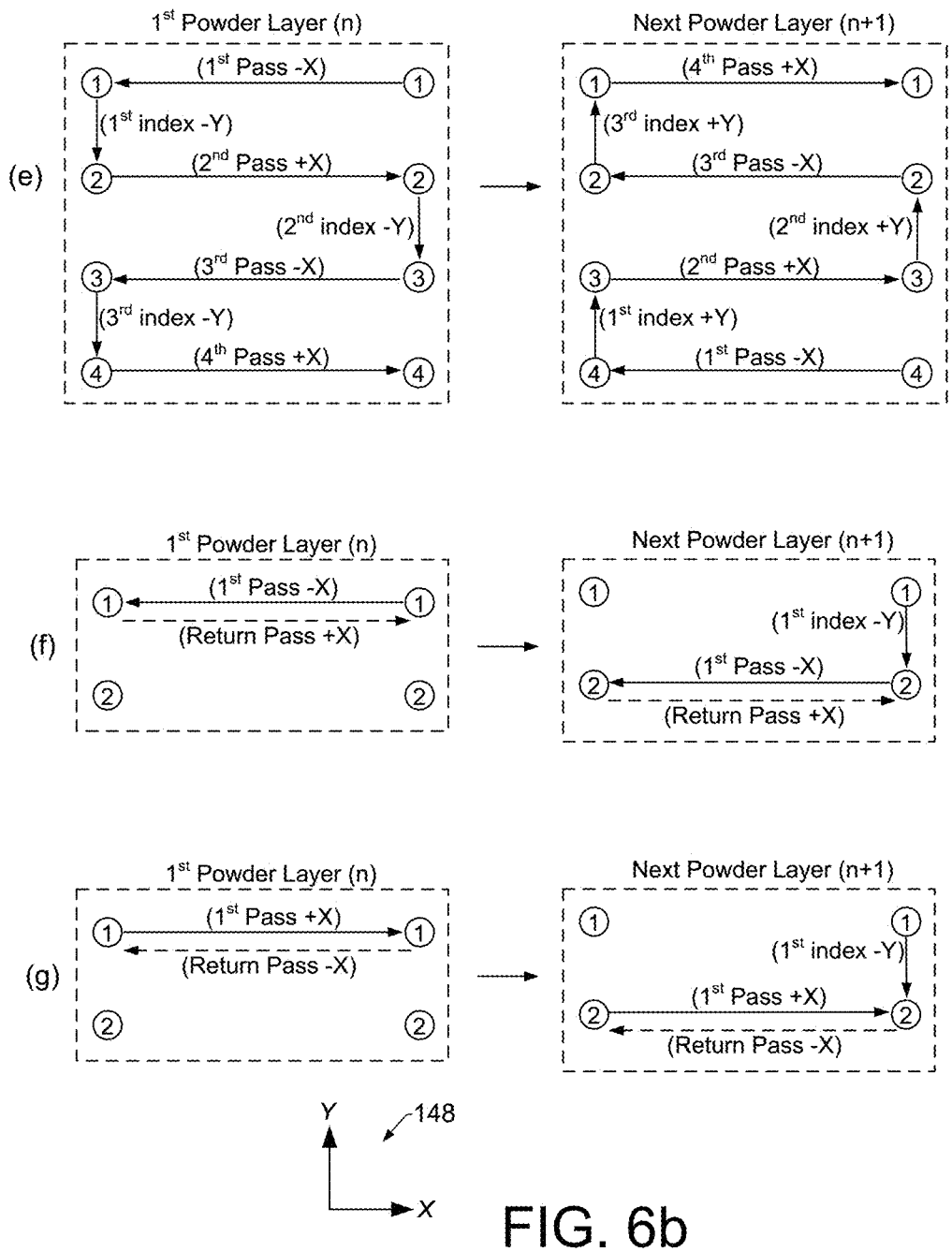

As mentioned above, executable instructions from an indexing module 136 can control the implementation by the printing device 100 of a variety of different indexing schemes. Different indexing schemes can define varying indexing directions and indexing offsets of the print bar 114 and/or the build platform 102, as well as the number and direction of multiple passes to be made over the platform 102 by the print bar 114. FIGS. 6a and 6b show some examples of different multiple pass indexing schemes that may be suitable for multiple pass 3D printing and indexing in a 3D printing system 100. The schemes will be described in terms of indexing the print bar 114 rather than indexing the build platform 102. However, the described schemes may apply in the same or similar manner when indexing the platform 102 as they do when indexing the print bar 114. While several schemes are illustrated and described, it should be apparent that many other indexing schemes are possible and contemplated herein.

Referring to FIGS. 6a and 6b, several examples of multiple pass indexing schemes (a)-(g) are illustrated using direction arrows to indicate the XY movements within an XY coordinate plane 148 of a print bar 114 over a build platform 102 in a 3D printing system 100. Different Y-coordinate index positions of the print bar 114, such as a first index position and a second index position, are illustrated using circled numbers. For example, a circle with a number one indicates a first index position, and so on. Each scheme indicates multiple print bar passes and indexes that are to be made while printing or depositing liquid agent onto a single layer of powder of a 3D object. The print bar 114, build platform 102, and printing system 100 are not shown in FIGS. 6a and 6b.

Referring to FIG. 6a, in an example multiple pass indexing scheme (a), a first powder layer of a 3D object can be printed by starting the print bar in a first indexed position (circle number 1), and scanning in a −X direction over the build platform in a first pass. A first index in the +Y direction can then move the print bar into a second indexed position (circle number 2), followed by scanning the print bar in a +X direction back over the build platform. A second index in the −Y direction can then return the print bar back to the first indexed position. In an alternate scheme (b), the first index direction and the second index direction can be reversed. These schemes can be repeated for subsequent powder layers of the 3D object.

In an example multiple pass indexing scheme (c), a first powder layer of a 3D object can be printed by starting the print bar in a first indexed position (circle number 1), and scanning in a −X direction over the build platform in a first pass. A first index in the +Y direction can then move the print bar into a second indexed position (circle number 2), followed by scanning the print bar in a +X direction back over the build platform. A next powder layer can then be applied to the 3D object, and the multiple pass indexing scheme (c) can continue in alternate ways. For example, for the next powder layer the print bar can begin in the second indexed position where it left off from the first powder layer. The first pass over the next powder layer would then be in the −X direction, followed by indexing in the −Y direction back to the first indexed position and a second pass in the +X direction. Alternatively, for the next powder layer, a return index in the −Y direction can return the print bar back to the first indexed position prior to the first pass in the −X direction.

In an example multiple pass indexing scheme (d), a first powder layer of a 3D object can be printed by starting the print bar in a first indexed position (circle number 1), and scanning in a −X direction over the build platform in a first pass. A first index in the −Y direction can then move the print bar into a second indexed position (circle number 2), followed by a second pass in the +X direction. A second index again in the −Y direction can then move the print bar into a third indexed position (circle number 3), followed by a third pass in the −X direction. A return pass in the +X direction can then be made to return the print bar to the starting side of the build platform. A next powder layer can then be applied to the 3D object, and the multiple pass indexing scheme (d) can continue in alternate ways. For example, for the next powder layer the print bar can begin in the third indexed position where it left off from the first powder layer. The first pass over the next powder layer would then be in the −X direction, followed by indexing in the +Y direction back to the second indexed position and a second pass in the +X direction, and so on. Alternatively, for the next powder layer a return index in the +Y direction can return the print bar back to the first indexed position prior to the first scan in the −X direction. While one example scheme is described for the next powder layer, other schemes for the next powder layer and subsequent powder layers are possible and are contemplated herein.

Referring now to FIG. 6b, in an example multiple pass indexing scheme (e), four passes are made over a first powder layer (n) on a build platform while indexing the print bar in a −Y direction following each pass. After the four passes are complete, a next powder layer (n+1) is applied to the platform and 4 passes are again made over the platform. The first pass over the n+1 powder layer begins in position 4, where the last pass over the first powder layer n ended. The four passes and the indexing over the n+1 layer proceed in just the opposite directions as the four passes and indexing over the first layer n. As noted above, other example schemes are possible and contemplated. For example, prior to beginning the first pass over the n+1 powder layer, the print bar might be indexed in the +Y direction back to position 1. Schemes (f) and (g) of FIG. 6b, illustrate examples of single pass indexing as described above with regard to FIG. 5.

Figure 7:
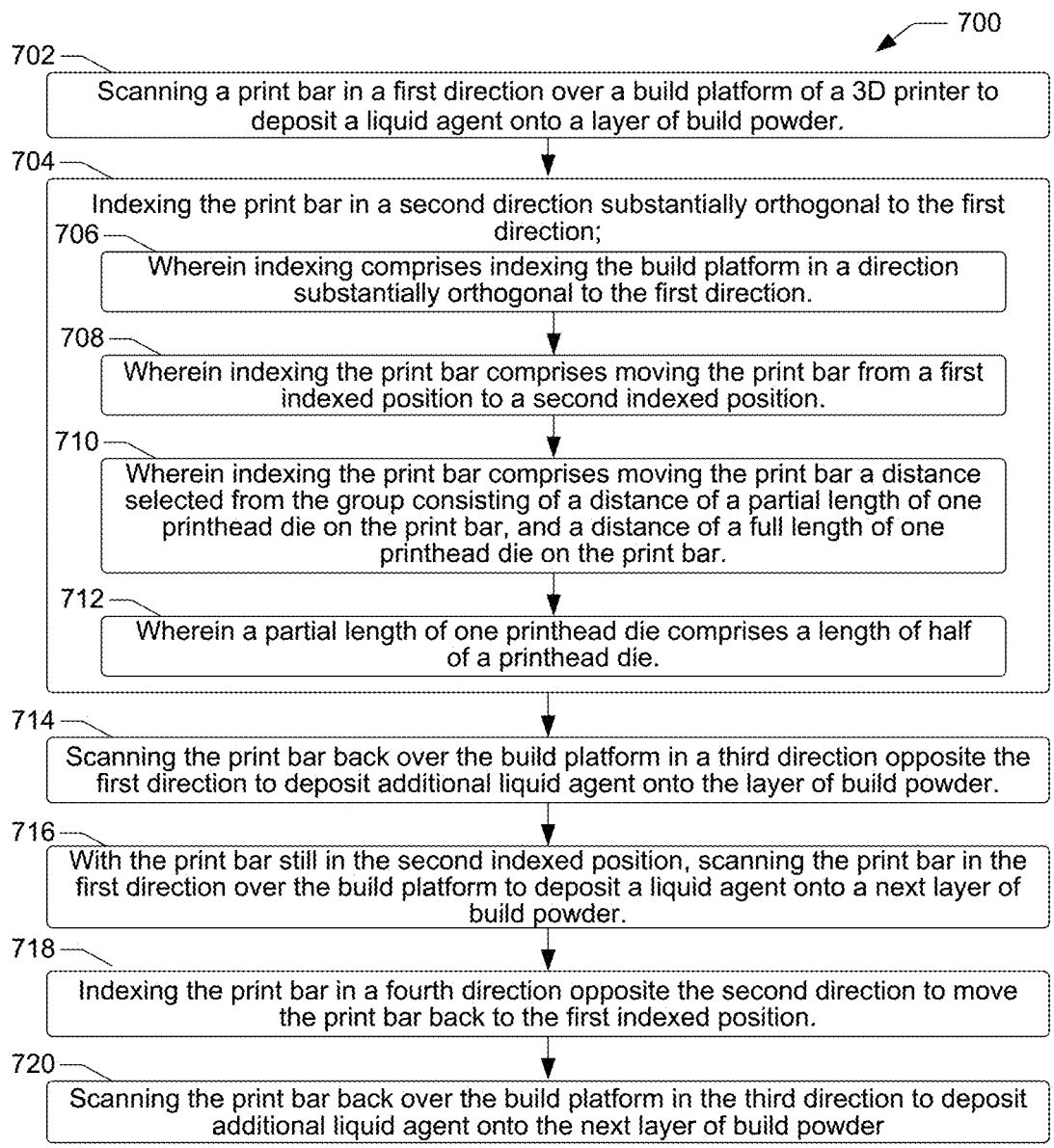
FIGS. 7 and 8 are flow diagrams showing example methods of printing a 3D object.
Figure 8:
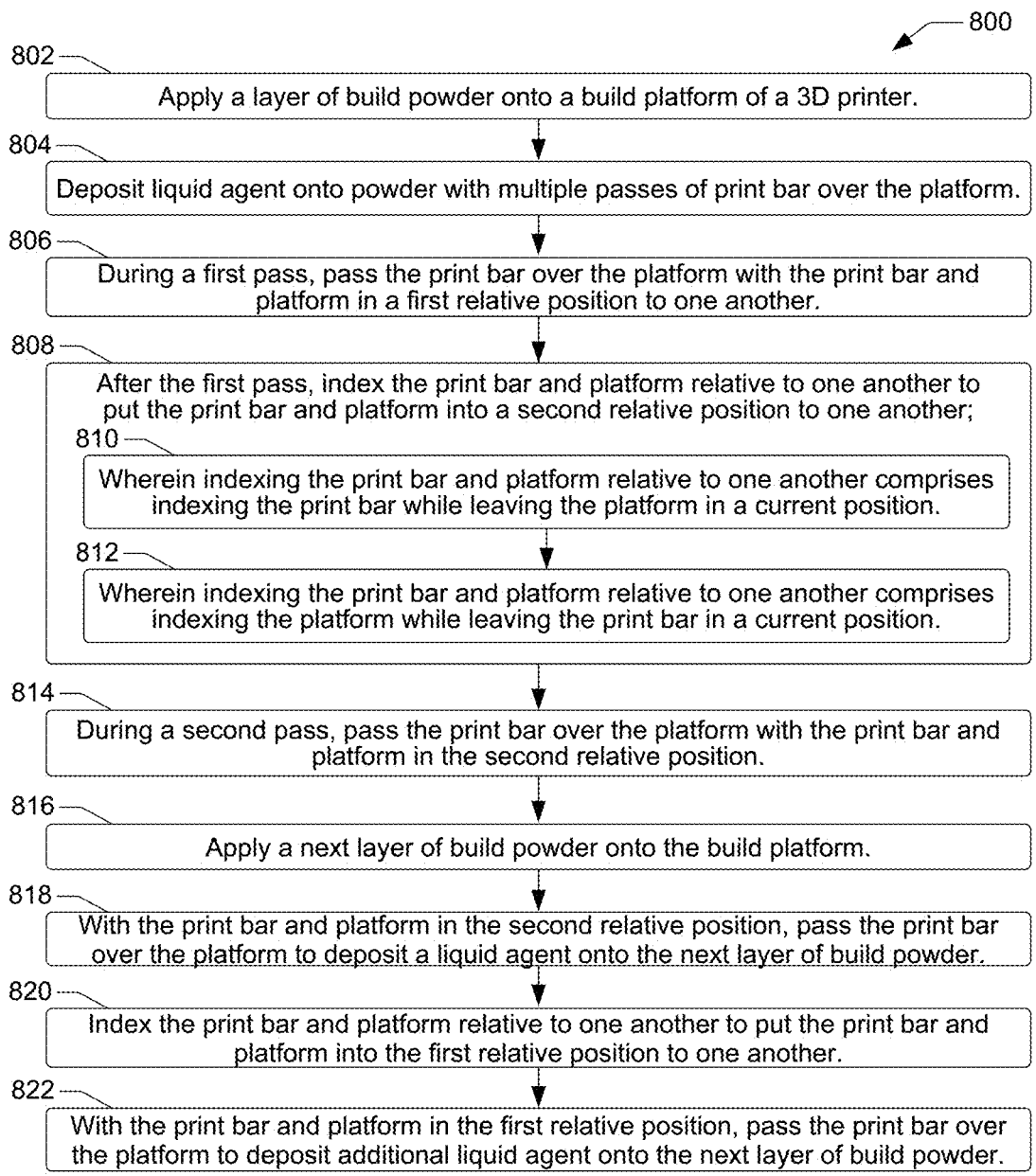

FIGS. 7 and 8 are flow diagrams showing example methods 700 and 800, of printing a three-dimensional (3D) object. Methods 700 and 800 are associated with examples discussed above with regard to FIGS. 1-6, and details of the operations shown in methods 700 and 800 can be found in the related discussion of such examples. The operations of methods 700 and 800 may be embodied as programming instructions stored on a non-transitory, machine-readable (e.g., computer/processor-readable) medium, such as memory 132 shown in FIG. 1. In some examples, implementing the operations of methods 700 and 800 can be achieved by a processor, such as a processor 130 of FIG. 1, reading and executing the programming instructions stored in a memory 132. In some examples, implementing the operations of methods 700 and 800 can be achieved using an ASIC and/or other hardware components alone or in combination with programming instructions executable by a processor 130.

The methods 700 and 800 may include more than one implementation, and different implementations of methods 700 and 800 may not employ every operation presented in the respective flow diagrams of FIGS. 7 and 8. Therefore, while the operations of methods 700 and 800 are presented in a particular order within their respective flow diagrams, the order of their presentations is not intended to be a limitation as to the order in which the operations may actually be implemented, or as to whether all of the operations may be implemented. For example, one implementation of method 800 might be achieved through the performance of a number of initial operations, without performing one or more subsequent operations, while another implementation of method 800 might be achieved through the performance of all of the operations.

Referring now to the flow diagram of FIG. 7, an example method 700 of printing a three-dimensional (3D) object begins at block 702 with scanning a print bar in a first direction over a build platform of a 3D printer to deposit a liquid agent onto a layer of build powder. In some examples, the method can include first depositing the layer of build powder onto the build platform. As shown in block 704, the method can include indexing the print bar in a second direction substantially orthogonal to the first direction. In some examples, the indexing can include indexing the build platform (i.e., instead or, or in addition to indexing the print bar) in a direction substantially orthogonal to the first direction, as shown at block 706. In some examples, indexing the print bar can include moving the print bar from a first indexed position to a second indexed position, as shown at block 708. As shown at block 710, in some examples indexing the print bar can include moving the print bar a distance of a partial length of one printhead die on the print bar, or a distance of a full length of one printhead die on the print bar. Moving the print bar a partial length of one printhead die can include moving the print bar a distance of half of a printhead die, as shown at block 712. Is some examples, the method can include applying fusing energy to the build powder on the platform after liquid agent has been applied to the powder. The method 700 can continue as shown at block 714, with scanning the print bar back over the build platform in a third direction opposite the first direction to deposit additional liquid agent onto the layer of build powder.

As shown at block 716, with the print bar still in the second indexed position, the print bar can be scanned in the first direction over the build platform to deposit a liquid agent onto a next layer of build powder. In some examples, the method can include depositing the next layer of build powder onto the build platform. As shown at blocks 718 and 720, respectively, the method can then include indexing the print bar in a fourth direction opposite the second direction to move the print bar back to the first indexed position, and scanning the print bar back over the build platform in the third direction to deposit additional liquid agent onto the next layer of build powder.

Referring now to the flow diagram of FIG. 8, an example method 800 of printing a three-dimensional (3D) object begins at block 802 with applying a layer of build powder onto a build platform of a 3D printer. The method 800 continues at block 804 with depositing liquid agent onto the build powder with multiple passes of the print bar over the platform. During a first pass, the print bar can pass over the platform with the print bar and platform in a first relative position to one another, as shown at block 806. After the first pass, the print bar and platform can be indexed relative to one another to put the print bar and platform into a second relative position to one another, as shown at block 808. In some examples, indexing the print bar and platform relative to one another can include indexing the print bar while leaving the platform in a current position, as shown at block 810. In some examples, indexing the print bar and platform relative to one another can include indexing the platform while leaving the print bar in a current position, as shown at block 812.

As shown at block 814, the method can continue with passing the print bar over the platform with the print bar and platform in the second relative position during a second pass. A next layer of build powder can then be applied onto the build platform, as shown at block 816. With the print bar and platform still in the second relative position, the print bar can be passed over the platform to deposit a liquid agent onto the next layer of build powder, as shown at block 818. As shown at block 820 and 822, respectively, the method 800 can also include indexing the print bar and platform relative to one another to put the print bar and platform back into the first relative position to one another, and with the print bar and platform in the first relative position, passing the print bar over the platform to deposit additional liquid agent onto the next layer of build powder.

What is claimed is:

1. A three-dimensional (3D) printing system comprising:
    a build platform to receive build powder;
    a platform-wide print bar to scan back and forth over the platform; and,
    a processor programmed with instructions from an indexing module to scan the print bar in a single pass and a first direction over the platform to enable selective printing of a liquid agent onto an entire layer of build powder, to index the print bar in a second direction substantially orthogonal to the first direction, and to scan the print bar back over the platform in a single pass and a third direction opposite the first direction to enable selective printing of additional liquid agent onto the layer of build powder.

2. The 3D printing system as in claim 1, further comprising:
    a print bar motorized indexing arm coupled to the print bar and controllable by the processor to index the print bar after each pass in a direction orthogonal to a direction of the scan.

3. The 3D printing system as in claim 1, further comprising:
    a platform motorized indexing arm coupled to the platform to index the platform after each pass in a direction orthogonal to the direction of the scan.

4. The 3D printing system as in claim 2, wherein the processor is programmed with further instructions to control an index offset and an index direction of the print bar motorized indexing arm.

5. The 3D printing system as in claim 3, wherein the processor is programmed with further instructions to control an index offset and an index direction of the platform motorized indexing arm.

6. The 3D printing system as in claim 1, wherein the processor is programmed with further instructions to control the print bar to print a similar loading or a different loading of the liquid agent with each pass of the print bar over the platform.

7. The 3D printing system as in claim 1, further comprising:
    a spreader to form build powder into layers over the platform; and,
    a fusing energy source to apply fusing energy to the layers;
    wherein the processor is programmed with further instructions to control the spreader to form each layer of build powder onto the platform prior to scanning the print bar in the first direction, and to control the fusing energy source to apply fusing energy to the build powder of each layer after scanning the print bar in the third direction.

* * * * *